United States Patent [19]
Haenel

[11] Patent Number: 5,960,082
[45] Date of Patent: Sep. 28, 1999

[54] POST-INITIALIZATION OF CHIP CARDS

[75] Inventor: Walter Haenel, Holzgerlingen, Germany

[73] Assignee: International Business Machines Corporation, Armonk, N.Y.

[21] Appl. No.: 08/915,194

[22] Filed: Aug. 20, 1997

[30] Foreign Application Priority Data

Aug. 20, 1996 [DE] Germany .......................... 196 33 466

[51] Int. Cl.⁶ ...................................................... H04L 9/00
[52] U.S. Cl. ................ 380/21; 380/23; 235/492
[58] Field of Search ........................ 380/21, 23; 235/492

[56] References Cited

U.S. PATENT DOCUMENTS 5,774,550  6/1998  Brinkmeyer et al. ..................... 380/21

*Primary Examiner*—Harold I. Pitts
*Attorney, Agent, or Firm*—K. O. Hesse

[57] ABSTRACT

The invention relates to the post-initialization of a chip card which has a processor, a non-volatile memory and an operating system with operating commands which may be utilized in a user mode. A key for a cryptographic algorithm is written onto the chip card, and after the conclusion of the initialization, additional data and/or applications are written onto the chip card by means of the operating commands.

9 Claims, 4 Drawing Sheets

POST-INITIALIZATION OF CHIP CARDS

BACKGROUND OF THE INVENTION

1. Field of the Invention

The present invention relates to the post-initialization of a chip card, the chip card having a processor, a non-volatile memory and an operating system with operating commands which are utilizable in a user operating mode. A key for a cryptographic algorithm is written onto the chip card and, after conclusion of the initialization, the chip card is switched at least once to a post-initialization status, which is differentiated from the operating mode.

2. Description of the Related Art

The production of a chip card up to the point where it may be provided to a user is described in: Rankl/Effing: *Handbuch der Chipkarten* [*Manual of Chip Cards*], Karl Hanser Verlag, 1996. After a module with the semiconductor chip is embedded into the card, all global data are written onto the chip card during the course of an initialization. These data are, for one thing, all data of an application which do not change from card to card and, for another, all of the person-independent data, which are also the same in every card. The initialization is the last production step in which all cards may be handled equally. For this reason, the initialization is performed on high-speed machines functioning in parallel. The individual-card related data of the application and the data related to specific persons are not loaded onto the chip card until the following production step, the personalization.

The production-technological reason for the differentiation into global, general data and individual or person-related data lies especially in the minimization of processing costs. Machines for personalization which are capable of writing individual data onto every chip card while maintaining the required security precautions are highly expensive because of the technology, and they have a low throughput rate of approximately 700 pieces per hour.

However, the separation of the production steps into initialization and personalization of a chip card is also of special significance from the standpoint of security technology. The illegal acquisition of personal data is made more difficult as a result of this separation.

If it should occur that, after the conclusion of the initialization, additional applications are to be written onto a small number of chip cards, then a post-initialization of the chip cards is required. A procedure for the subsequent writing of applications onto chip cards is known from EP-A2-0 361 491. In this process, the memory areas of the chip card which may be written to are provided with a control flag by means of a cryptographic function. This control flag is generated when a partial area of the memory of a chip card is defined as usable. The definition of partial areas of the memory as usable for specific applications takes place during initialization. In order to make it possible to write applications after the conclusion of initialization, memory areas in addition to the applications written at the time of initialization are defined and provided with a control flag, thus indicating the usability of these memory areas. These additional memory areas remain unused initially. During the later process for secondary loading of an additional application, these control flags allow recognition of whether a specific memory area may be utilized for the additional application to be written.

A disadvantage of the process described is that it is necessary to recognize at the time of the initialization which and how many additional applications are to be written onto a chip card at some time after the conclusion of the initialization. Since the memory area on the chip card is very limited, it would not be cost-effective to define usable memory areas with control flags during the process of initialization if they would not be written with additional applications at a later time. On the other hand, it would be a defect which could not be corrected if an inadequate memory area with control flags were created during the initialization.

A further procedure which is used to write additional applications onto the chip card is the secondary expansion of the personalization commands. As a result of this, especially additional personalization commands which are useful for the generation of file structures and file contents on the chip card are written as an additional program code into the memory of the chip card. With the help of these additional personalization commands, it is then possible to post-initialize the chip card. By the writing of the additional program code, the quantity of data to be stored on the chip card is increased. This has the disadvantage that only a very limited memory area is available on the chip card.

A further disadvantage of the known procedure is that the personalization commands for post-initialization to be written to the chip card can only be used in the specific personalization mode as provided by the manufacturer, which is dependent on the given operating system.

SUMMARY OF THE INVENTION

The underlying object of the invention is therefore the creation of a flexible means for the post-initialization of chip cards which ensures the cost-efficient production of the chip cards.

The object of the invention is achieved in that, in the post-initialization status, further data making use of operating commands are written onto the chip card, whereby the operating commands are employed with the use of a key.

The essential benefit which is realized compared to the current state of the art exists in the possibility of writing additional applications onto the chip card at any point in time after the conclusion of the initialization, whereby commands and keys which already exist on the chip card are utilized to do so. A processing step for the writing of an additional program code and the resulting expansion of the total program code on the chip card are avoided. As a result, additional memory area is made available on the chip card for application-oriented data.

The invention has the further benefit that the modifications which are made in the memory area of the chip card during the post-initialization of the chip card are limited to the modifications required for writing the respective applications. Modifications in the memory area of the chip card are made after the conclusion of the initialization at that point in time at which the writing of the additional applications onto the chip card is to be performed.

It is a further benefit of the invention that the operating commands employed for the post-initialization are independent from the personalization scheme of the individual chip-card manufacturer and represent standardized commands which may be utilized in applications with all chip cards.

A beneficial embodiment of the invention may be created through the production of a modified key, after which, with the help of the key, one or more operating commands may be used in order to write further data onto the chip card after conclusion of the initialization, and the operating commands may be used by means of the modified key to write additional data onto the chip card. As a result of this, it is possible during post-initialization to write data records of different users onto the chip card which are coded independently of one another. A further benefit exists in that a mixing of the commands of the different applications is not possible.

In a useful embodiment of the invention, the modified key can be produced by overwriting of the key, whereby the key and the modified key use one and the same memory area, and additional memory area for modified keys which are to be produced is thus saved.

A beneficial expanded embodiment of the invention provides that the additional data contain user-dependent and/or user-independent data. As a result of this, it is possible to write both types of data onto the chip card within the context of a one-time post-initialization.

The key may appropriately be written during the course of the initialization of the chip card. This is beneficial since data are written onto the card as a standard procedure during the course of initialization and the writing of the key in this instance does not present the requirement for an additional procedural step.

In an expanded embodiment of the invention, the chip card may be switched out of the operating mode into the post-initialization status. As a result of this, a post-initialization is also possible when the chip card has already been used one or more times by the chip-card owner.

It may be beneficial to provide that, during a use of the key and/or the modified key, a random number is incorporated, whereby the random number is replaced by a fixed numerical value during writing of further data onto the chip card. The incorporation of a random number ensures the maintenance of security requirements during the use of the key or of the modified key. The time-limited replacement of the random number by a fixed numerical value also makes it possible to use the key and/or the modified key in a status of the chip card in which the generation of random numbers is not provided.

A beneficial embodiment of the invention provides that, during the course of the initialization, a personalization key is written onto the chip card, and that the personalization key is used as a key for the cryptographic algorithm. As a result of this, the cost-effective and time-effective post-initialization of the chip card is possible, since data are written onto the chip card in the context of the personalization in any event.

In a further beneficial embodiment, the invention takes the form of a chip card having a processor connected to a non-volatile memory which stores an operating system with operating commands and upon which data, especially user-independent data and/or applications, may be written during an initialization, and upon which a key for a cryptographic algorithm may be written, and upon which additional data may be written using the operating commands and the key during a post-initialization period after the conclusion of the initialization.

DETAILED DESCRIPTION OF THE PREFERRED EMBODIMENT

Figure 1:
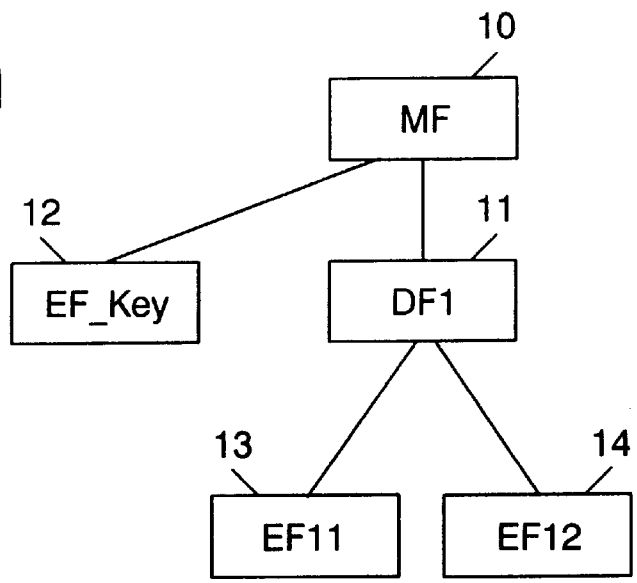
FIG. 1 shows a file system of a chip card.

Referring now to FIG. 1, a file system is shown as it exists in the memory on a chip card. The root directory 10, which is selected implicitly after a reset of the chip card, has the designation Master File, and is abbreviated MF. All of the other directories and files are located here. The MF 10 represents the entire memory available in the chip card for the data storage area. A Dedicated File 11, abbreviated DF1, in which other files are compiled, exists under MF 10. The user data which are necessary for an application 1 are located in the EF's 13, 14, which is the abbreviation for Elementary File. Here, EF11 13 contains data of the chip card issuer (for example, the bank transit number of a bank) and EF12 14 contains customer-specific data (for example, an account number). The file EF_Key 12 contains different keys for cryptographic algorithms. Among these are a post-initialization key and the personalization key.

The file system represented in FIG. 1 is written to a chip card within the context of the initialization. Special initialization commands are utilized for this. Since these initialization commands allow a number of manipulations on a chip card, the chip card is converted into a status after the conclusion of the initialization in which it is not possible to execute the initialization commands.

In general, the procedural step of personalization follows the initialization. The personal data of the eventual chip card user are written to the card during personalization by means of personalization commands.

After the personalization is concluded, the chip card is converted into the operating mode status. In the operating mode, the chip card may be utilized by the card user within the context of different applications, preferably for communication between the chip card and a terminal. For the execution of the respective applications, operating commands are available in the operating mode which are a component part of the operating system which is written to the chip card as a ROM mask. If it should become necessary to write further applications to the chip card at any time after conclusion of the initialization, then the chip card is first switched over to a post-initialization status. In this status, the initialization commands are not executable. A switch-over to the post-initialization status is also possible after the chip card has already been used in the operating mode by the chip-card user.

Figure 2:
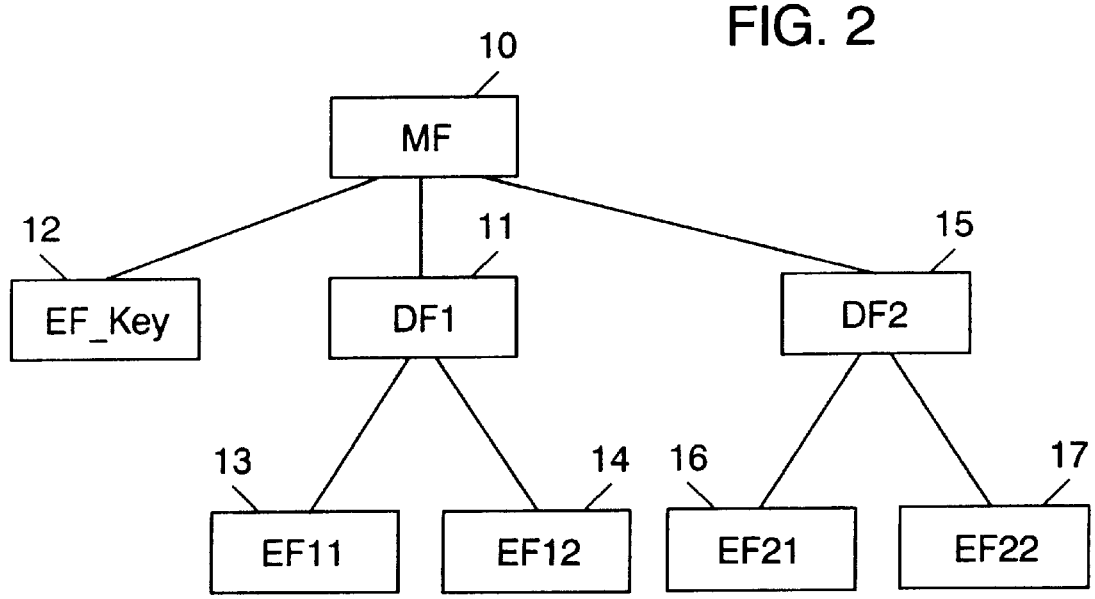
FIG. 2 shows an expanded file system of a chip card.

In the post-initialization status and with the use of the procedure in accordance with the invention, a second Dedicated File DF2 15 is written to the chip card with two Elementary Files EF21 16 and EF22 17 as is depicted in FIG. 2. The operating commands which were already written to the chip card with the operating system are utilized during post-initialization as well as during initialization, personalization and during operating mode. With DF2 15, EF21 16 and EF22 17, the user of the chip card acquires the availability for utilization of his chip card within the context of an application 2.

Figure 3:
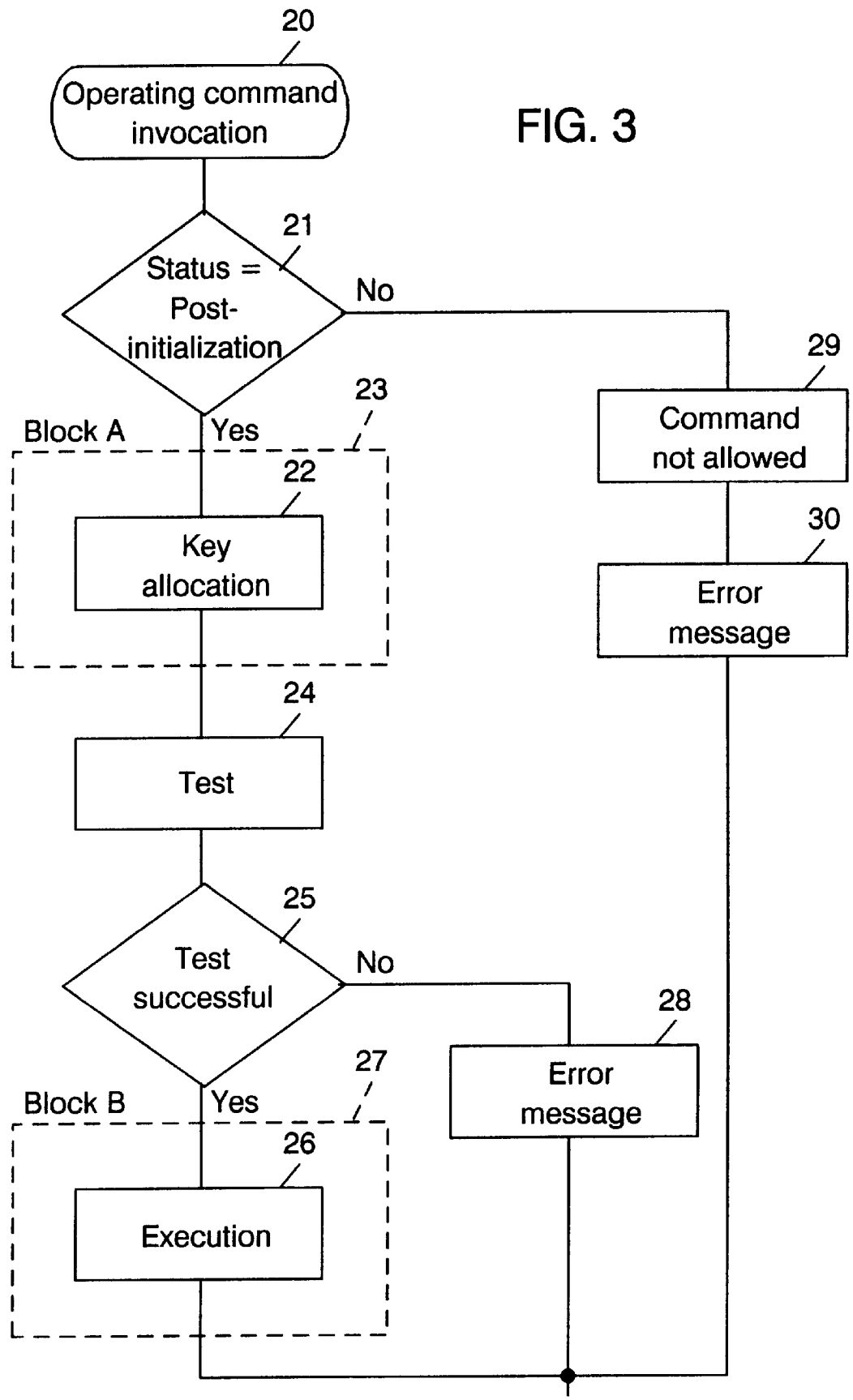
FIG. 3 shows a program flowchart of the procedure in accordance with the invention.

After the invocation of an operating command 20 has taken place for writing DF2 15, EF21 16 and EF22 17, the status of the chip card 21 is first determined in the procedure in accordance with the sequence of operations depicted in FIG. 3. If the chip card is in a post-initialization status, which is a specifically different status from the operating mode, then access will be provided to the post-initialization key filed in the EF_Key 12 within the context of a key allocation 22. In the next step, the command will be tested at block 24 using the post-initialization key.

If this test at 24 is successful by yielding a positive result, then the invoked operating command is executed at block 26. If the test is not successful, an error message is created at block 28 and processing of the invoked operating command is aborted. If it is established during the determination of the status of the chip card 21 that the card is not in a post-initialization status, then the execution of the invoked operating command is not allowed as depicted at block 29 and an error message is generated at block 30.

It is frequently the case that the operating commands allow random numbers to be incorporated into their encoding, whereby these random numbers are generated dynamically by the chip card and must be queried by the application on the chip card. If random numbers are employed during the encoding, then the procedure in accordance with the invention as it is schematically represented in FIG. 3 is expanded by one step. After the key allocation at block 22 and before the operating command is tested with the help of the post-initialization key 25, the random number receives a fixed value. The operating command may then be executed by circumvention of the random number.

If, after conclusion of the initialization and especially during the personalization, the requirement exists to write multiple additional file supplements for more than one application onto the chip card, then it is advantageous that this be performed by means of multiple post-initialization keys. For this, the post-initialization keys are first filed in EF_Key 12.

Figure 4:
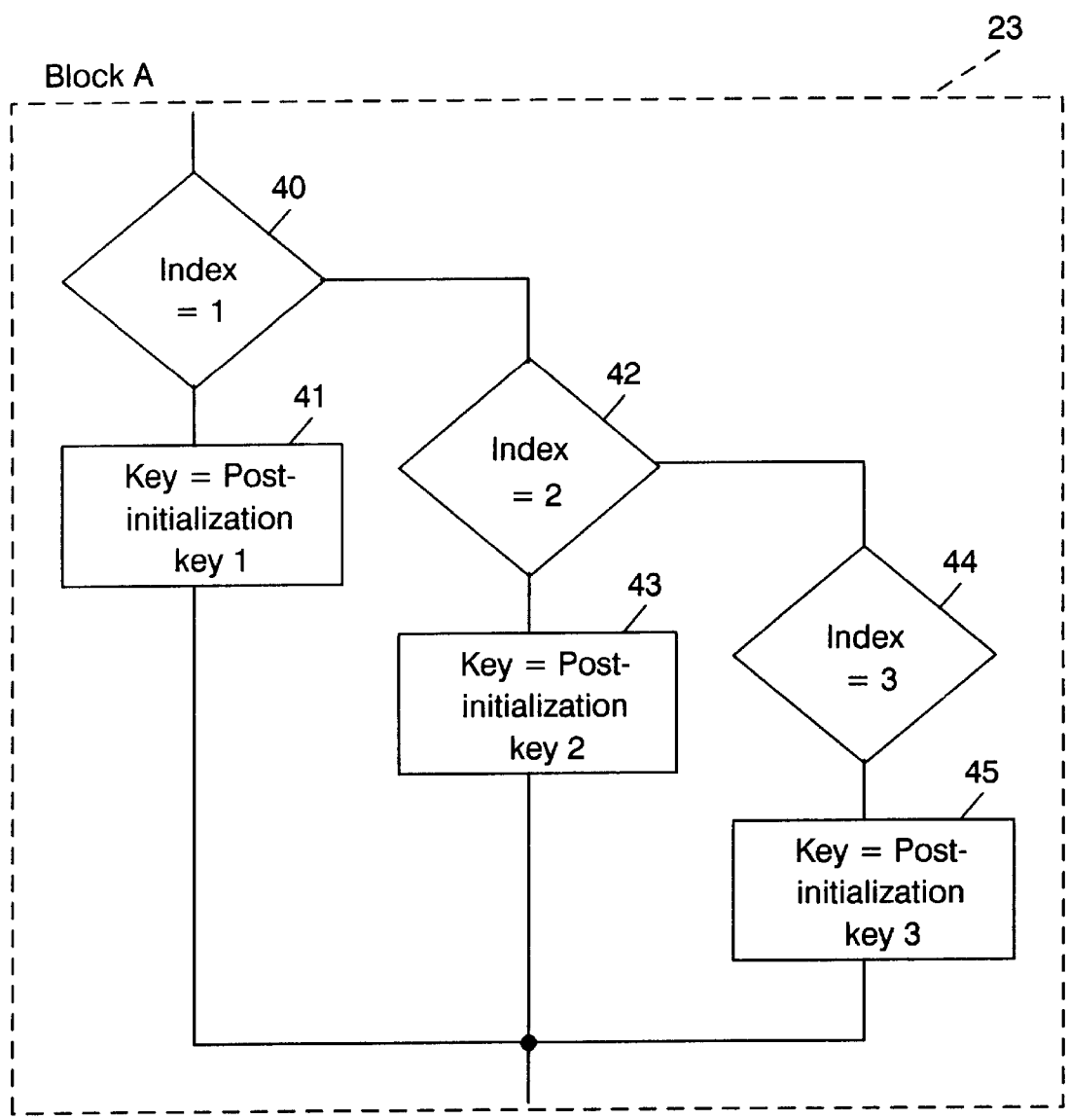
FIG. 4 is a modified block A of the program flowchart when three post-initialization keys are available.
Figure 5:
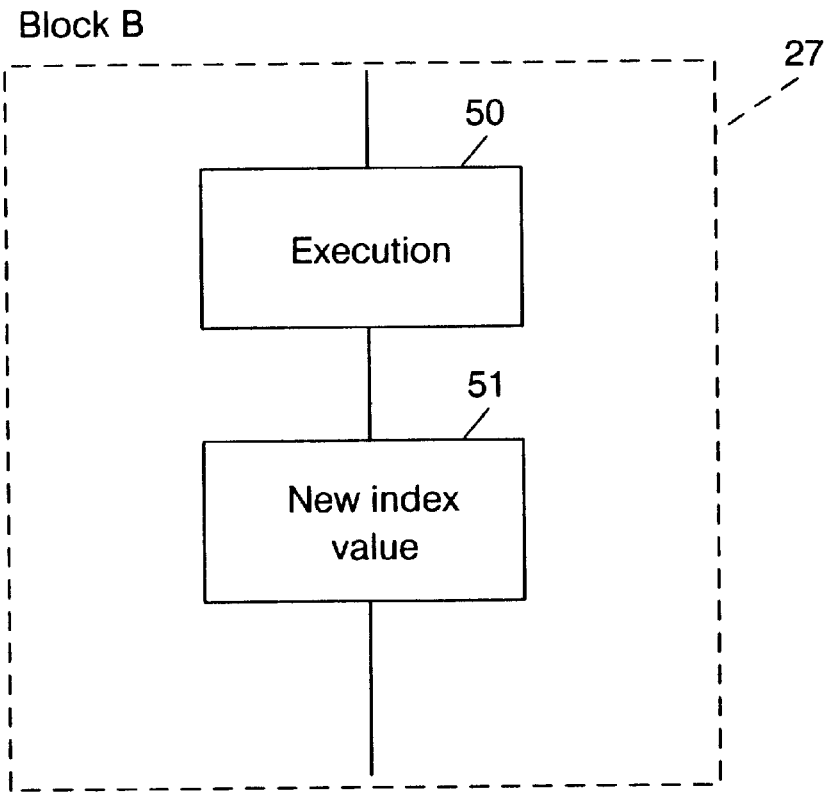
FIG. 5 is a modified block B of the program flowchart when three post-initialization keys are available.
Figure 6:
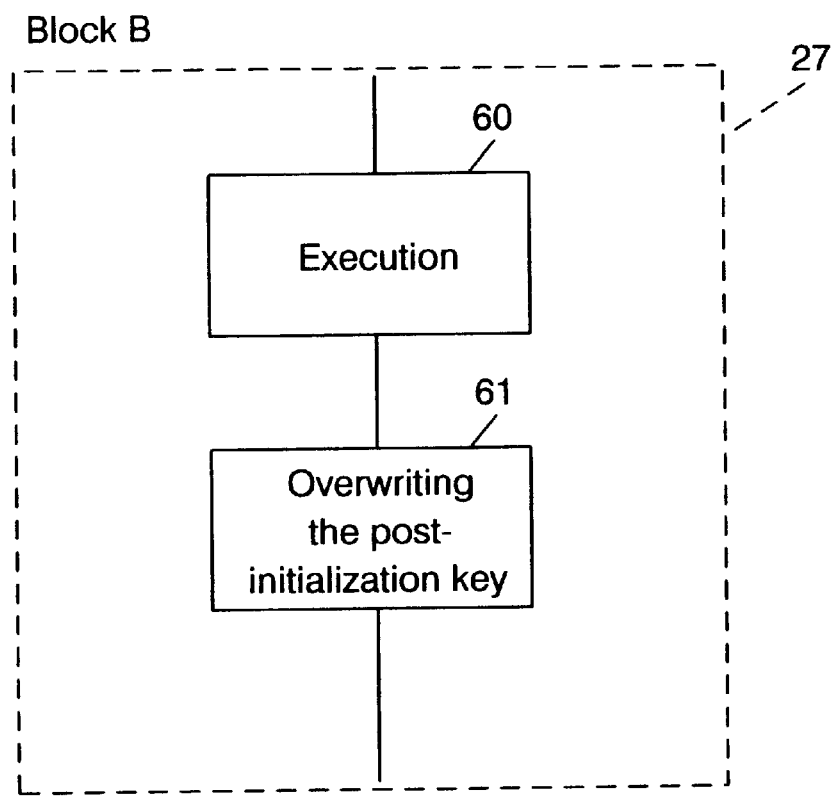
FIG. 6 is a modified block B of the program flowchart when the post-initialization keys are overwritten.

In FIGS. 4 and 5 the modified blocks A 23 and B 27 are represented, as contrasted to FIG. 1, depicting the instance where three post-initialization keys are available. A switch-over is made between the post-initialization keys filed in EF_Key 12 when a new application with the associated files is written onto the chip card. The switch-over may take place with the help of a command which is available as a default, especially by means of the command PUTDATA. For this, the card is expanded by an indicator or index which refers to the respectively-active post-initialization key. As is represented in block A 27 in FIG. 4, the respective post-initialization key is allocated as a function of the index. After execution of the operating command 20, the index value 51 is modified (FIG. 5).

The invention may be implemented in an especially beneficial manner when, instead of the simultaneous storage of several post-initialization keys, the active post-initialization key, which was employed for the writing of an application, is overwritten as a final step. Here, only one post-initialization key must always be saved, thus saving coding and space. The expansion of block A 23 depicted in FIG. 4 is then eliminated again, since only one post-initialization key exists simultaneously at all times. In accordance with the representation of block B 27 in FIG. 5, a used post-initialization key is overwritten at 61 after execution of an operating command. Following that, a modified post-initialization key is available for a subsequent post-initialization. For multiple post-initializations, the post-initialization key is overwritten more than once.

In a further beneficial embodiment of the invention, the personalization key which is available for the personalization of the chip card is employed as the post-initialization key. This personalization key must be written to the card in all cases. With its employment in the procedure for post-initialization as described, an existing key is thus employed, and thus use of memory area for filing another post-initialization key is avoided.

Many modifications and adaptations to the present invention could be made to advantage without departing from the spirit of this invention. Further some features of the present invention could be used without use of other features. Accordingly, this description should be considered as merely illustrative of the principles of the present invention and not in limitation thereof.

What is claimed is:

1. Method for post-initializing a chip card, the card having a processor, a non-volatile memory and an operating system with operating commands which are usable in a user operating mode, comprising the acts of:

writing a key for a cryptographic algorithm onto the chip card;

initializing the chip card;

switching over at least once to a post-initialization status from an operating mode, writing additional data to the chip card in the post-initialization status with the use of the operating commands in conjunction with the key.

2. Method in accordance with claim 1, further comprising:

generating a modified key after operating commands are used in conjunction with the key to write further data onto the chip card after initialization, and writing additional data onto the chip card with the use of the operating commands in conjunction with the modified key.

3. Method in accordance with claim 2, comprising:

overwriting the key with the modified key.

4. Method in accordance with claim 1, comprising:

writing user-dependent and user-independent data to the chip card in the post-initialization status with the use of the operating commands.

5. Method in accordance with claim 1, comprising:

writing the key during the initialization of the chip card.

6. Method in accordance with claim 1, comprising:

switching the chip card from a personalization mode into the post-initialization status.

7. Method in accordance with claim 1, comprising:

replacing a random number by a fixed numerical value while using the key during the writing of the additional data onto the chip card.

8. Method in accordance with claim 1, comprising:

writing a personalization key onto the chip card during the initialization; and using the personalization key as the key for the cryptographic algorithm.

9. A chip card having a processor, a non-volatile memory and an operating system with operating commands, and:

upon which data, including user-independent data and applications, is written during initialization of the chip card;

upon which a key for a cryptographic algorithm is written; and upon which additional data is written after the conclusion of initialization using the operating commands in conjunction with the key.

* * * * *